Oct. 17, 1967 V. H. WOEHLER 3,348,111
DIRECT CURRENT MOTOR WITH MULTIPLE FIELD
WINDINGS CONNECTED IN PARALLEL
Original Filed Sept. 11, 1963 2 Sheets-Sheet 1
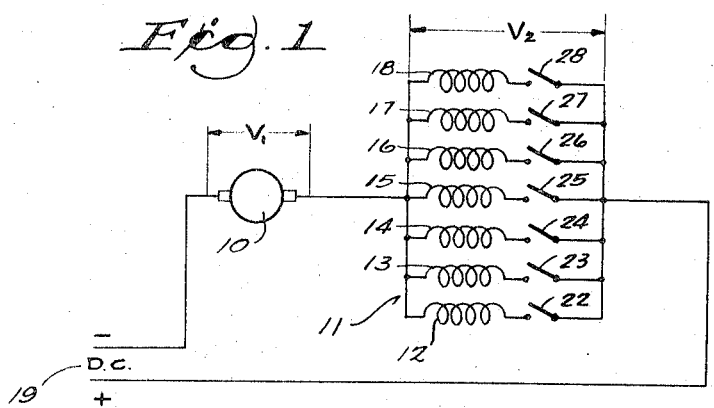
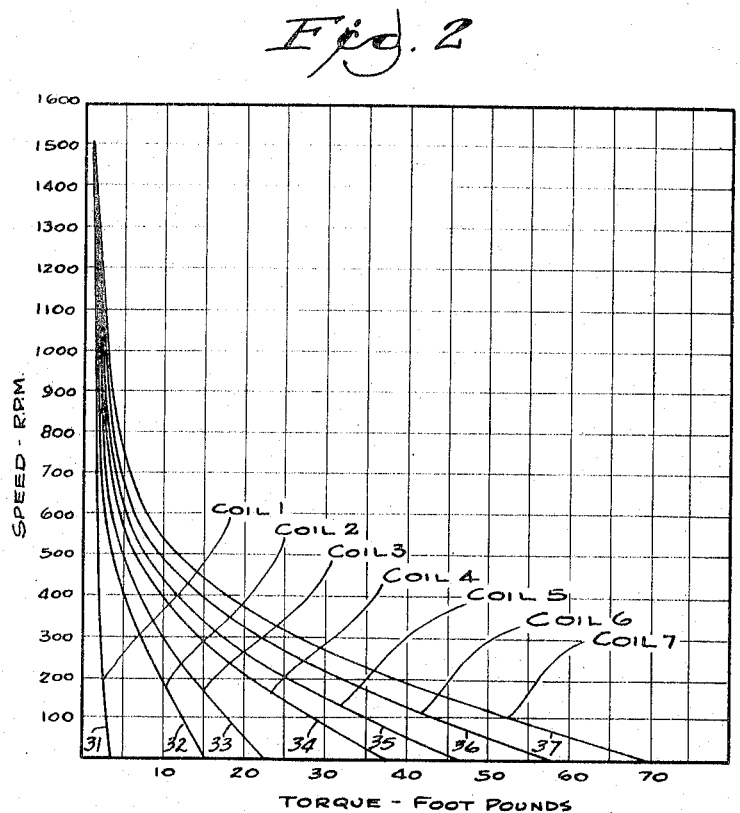
INVENTOR.
VERNON HAROLD WOEHLER
BY
Wheeler, Wheeler & Wheeler
ATTORNEYS

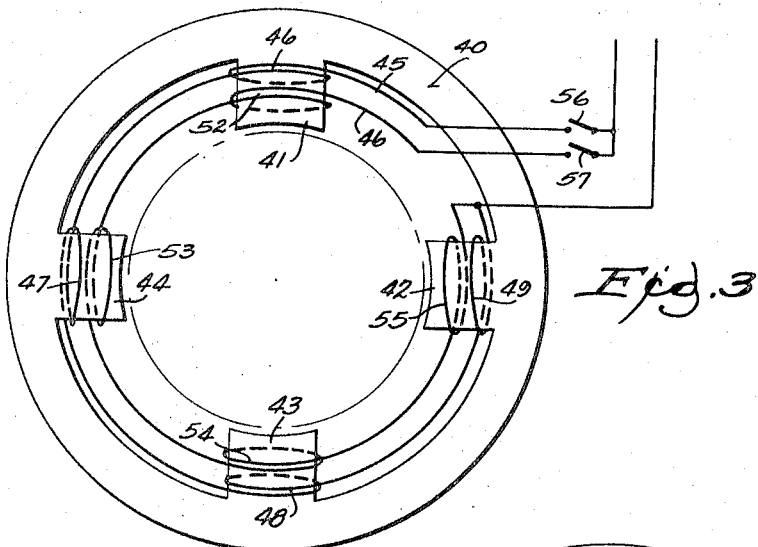
Fig. 3
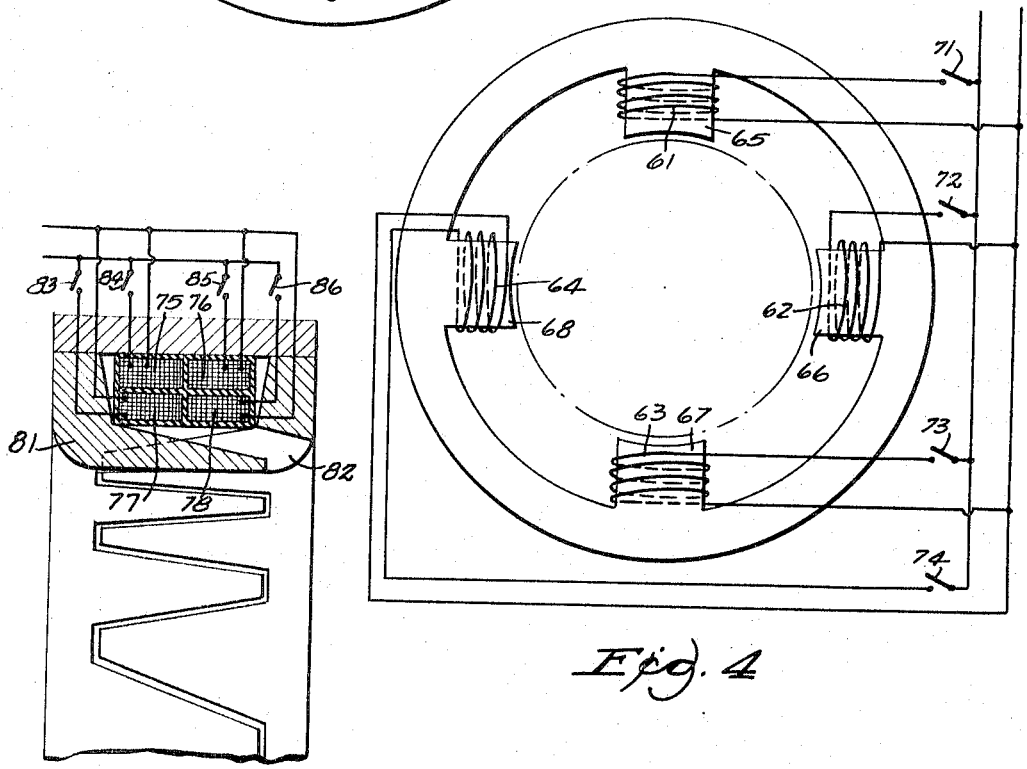
Fig. 4
Fig. 5
INVENTOR.
VERNON HAROLD WOEHLER
BY
Wheeler, Wheeler & Wheeler
ATTORNEYS

United States Patent Office

3,348,111
Patented Oct. 17, 1967

3,348,111
DIRECT CURRENT MOTOR WITH MULTIPLE FIELD WINDINGS CONNECTED IN PARALLEL
Vernon Harold Woehler, 2007 S. Gladys Ave., Appleton, Wis. 54911
Continuation of application Ser. No. 308,125, Sept. 11, 1963. This application May 5, 1967, Ser. No. 636,552
3 Claims. (Cl. 318—252)

This application is a continuation of application S.N. 308,125 filed Sept. 11, 1963, now abandoned.

This invention relates to a direct current motor with multiple field windings connected in parallel.

While the invention is believed to have particular utility in connection with battery powered driving motors on small vehicles such as golf carts, materials handling lift trucks, tractors, etc., the invention is not limited to these fields of use but is applicable to any controllable direct current motor.

In accordance with the present invention, wide ranges of armature speed and torque are achieved without the use of rheostats or other power consuming and troublesome control mechanisms. The operating efficiency of motors embodying the present invention is improved over prior art direct current motors using control rheostats, etc. Moreover, motors embodying the present invention are adapted for use with much lighter starting and control equipment than prior art direct current motors.

In this connection, torque and speed changes in motors embodying the present invention are achieved without changing the basic motor circuitry. Moreover, these changes are accomplished without interrupting heavy current flow. Accordingly, switch arcing is minimized and the maintenance requirements for switching equipment used with the motor are reduced.

Direct current motors embodying the invention may be energized by a constant potential source of direct current. The motor has an armature and a plurality of field pole coils, each of which is in series with the armature and in parallel with one another and having switch means for selectively connecting one or more of said coils directly in series with the armature.

Each such coil desirably has its own switch. Accordingly, only the current flowing through such coil will be affected by opening or closing its switch. Accordingly, only a portion of the total current flowing through the armature is affected in the operation of any one switch.

The constant potential of the source will divide across the armature and across the field in proportion to the relative resistance of the armature and the field. As more of the field coils are placed in parallel with one another, the effective resistance of the field will be reduced, thus to increase the voltage drop across the armature. At the same time, the total field energization is increased because of the increase in the number of energized field coils. This has a cumulative or exponential effect upon the speed and torque of the motor.

Other features, advantages and objects of the invention will appear from the following disclosure, in which:

FIG. 1 is a circuit diagram of one embodiment of the invention.

FIG. 2 is a graph of speed against torque showing the plot of curves in an experimental unit embodying the invention and showing the results of changing the number of coils included in the field circuit.

FIG. 3 is a diagrammatic view of a salient pole field structure illustrating one mode of winding the field coils in accordance with the present invention.

FIG. 4 is a diagrammatic view of a salient pole field structure illustrating another mode of winding the field coils in accordance with the present invention.

FIG. 5 is a diagrammatic view of a toroidal pole field structure illustrating still another mode of winding field coils in accordance with the present invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Direct current motors embodying the invention include an armature 10 and a bank of field coils 11. The bank comprises a plurality of field coils, for example, 12, 13, 14, 15, 16, 17, 18 etc. all connected in parallel with one another but connected in series with respect to the armature 10 and a source 19 of direct current potential.

The coils 12–18 inclusive may be distributed in any way on the various poles of the field structure of the motor. Some coils may be on one pole and some on another or all coils may be wound part each on each pole of the motor.

The total voltage from source 19 will divide between the armature 10 and the field coil assembly as shown respectively at $V_1$ and $V_2$.

The respective coils 12–18 inclusive are provided with individual switches 22, 23, 24, 25, 26, 27, 28 by which each coil is independently controlled.

If only one of the field coils, for example coil 12, is in the circuit by reason of the closure of switch 22, $V_1$ will be low with respect to $V_2$. The field flux generated by the field structure 11 will be relatively low because only one of the coils 12 through 18 will be in the circuit. Accordingly, the motor will operate along the typical speed torque curve shown at 31 in FIGURE 2. If switch 23 is now closed to include coil 13 in the circuit, $V_2$ will drop and $V_1$ will correspondingly increase and the motor will operate along the speed torque curve 32 of FIGURE 2. Speed-torque curves for each step in addition of field coils to the circuit are shown in curves 31–37 inclusive in FIGURE 2.

Even though $V_2$ drops every time an additional one or more of the coils 12–18 inclusive is switched into the field circuit, total excitation of the field nevertheless increases because of the increased number of coils which generate field flux. The total ampere-turns of the field is increased as switches 22–28 are progressively closed.

FIG. 3 illustrates one mode of distributing the field windings in accordance with the present invention. This figure shows a field structure 40 having salient poles 41, 42, 43, 44. Only two coils 45, 46 are shown, to simplify the illustration. These have respective windings 46, 47, 48 and 49 (for coil 45) and 52, 53, 54, 55 (for coil 46) distributed equally on all four poles 41–44 inclusive. The respective coils have switches 56, 57 which function as switches 22–28 inclusive of FIG. 1. In the embodiment of FIG. 3, a balanced magnetic circuit results from distributing the windings as shown.

An unbalanced magnetic circuit would result if each coil had windings on less than all of the poles. This is illustrated in FIG. 4 in which four coils 61, 62, 63, 64 are illustrated, each on a different pole 65, 66, 67, 68 of the field structure 69, each coil having its own switch 71, 72, 73, and 74.

The invention is also adaptable for a toroidal field structure in which the field coil would consist of a plurality of annular windings in the interpolar space of the toroid. This is illustrated diagrammatically in FIG. 5, four coils 75, 76, 77 and 78 being shown between the rings 81, 82 of the toroidal field structure. Each coil has its own switch 83, 84, 85 and 86. This structure is also balanced magnetically.

From the foregoing it is clear that direct current motors embodying the present invention have torque-speed controllers by which the motor speed and torque is controlled in a full range of steps from low speed to high speed by utilizing a plural number of field coils equal to the number of torque-speed steps in the full range. Each coil has a manually actuated switch to selectively connect one or more of the coils directly in series with the armature and in parallel with an other coil so connected. Accordingly, for each said step there is a different number of coils in parallel with each other but in direct series connection with the armature.

I claim:

1. In a direct current motor having an armature, a series wound field and a torque-speed controller, the improvement in said controller for providing motor torque and speed control in a full range of steps from low speed to high speed, said improvement comprising said series wound field having a plural number of field coils equal to the number of torque-speed steps in said full range, and a manually actuated switch for each coil to selectively disconnect one or more coils from the field or connect one or more of said coils in the field directly in a series with the armature and in parallel with any other coil so connected so that for each said step there is a different number of coils in parallel with each other but in direct series connection with the armature and the resistance of the field decreases and the voltage drop across the armature increases as said switches are successively closed.

2. The motor of claim 1 in which the motor field comprises multiple field poles, said coils having windings distributed with respect to said poles to magnetically balance the field circuit.

3. The motor of claim 1 in which said coils are arranged in a bank of coils in parallel with each other and in series with the armature, the opening of the switch for any one coil disconnecting it from the bank, the applied voltage across the armature and the bank dividing therebetween with the voltage across the armature increasing and the voltage across the bank decreasing as the coils are successively switched into the bank.

References Cited

UNITED STATES PATENTS

| | | | |
|---|---|---|---|
| 337,793 | 3/1886 | Sprague | 318—246 |
| 460,076 | 9/1891 | Wheeler | 318—252 |
| 468,128 | 2/1892 | Blackwell | 318—252 XR |
| 481,739 | 8/1892 | Sprague | 318—351 |
| 960,896 | 6/1910 | Gruenfeldt | 318—252 |
| 2,586,841 | 2/1952 | Mayer | 318—252 |

BENJAMIN DOBECK, *Primary Examiner.*